(12) United States Patent
Zhang et al.

(10) Patent No.: US 12,253,365 B2
(45) Date of Patent: Mar. 18, 2025

(54) METHOD, APPARATUS, AND SYSTEM FOR AGGREGATING A ROUTE BASED ON HIGH-RESOLUTION SAMPLING

(71) Applicant: HERE Global B.V., Eindhoven (NL)

(72) Inventors: Zhenhua Zhang, Chicago, IL (US); Aparna Rajagopal, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 57 days.

(21) Appl. No.: 17/476,137

(22) Filed: Sep. 15, 2021

(65) Prior Publication Data

US 2023/0080319 A1  Mar. 16, 2023

(51) Int. Cl.
| | |
|---|---|
| G01C 21/34 | (2006.01) |
| B60W 60/00 | (2020.01) |
| G01C 21/00 | (2006.01) |
| G01C 21/30 | (2006.01) |
| G01C 21/36 | (2006.01) |

(52) U.S. Cl.
CPC ....... *G01C 21/3415* (2013.01); *B60W 60/001* (2020.02); *G01C 21/30* (2013.01); *G01C 21/3461* (2013.01); *G01C 21/3626* (2013.01); *G01C 21/3807* (2020.08); *B60W 2556/50* (2020.02)

(58) Field of Classification Search
CPC ............ G01C 21/3415; G01C 21/3807; G01C 21/30; G01C 21/3461; G01C 21/3626; B60W 60/001; B60W 2556/50
See application file for complete search history.

(56) References Cited

U.S. PATENT DOCUMENTS

| | | | |
|---|---|---|---|
| 8,718,932 B1 * | 5/2014 | Pack ............... | G01C 21/30 701/446 |
| 9,851,212 B2 | 12/2017 | Stephens et al. | |
| 10,300,921 B2 | 5/2019 | Carlsson et al. | |

(Continued)

OTHER PUBLICATIONS

Quddus et al., abstract of "Enhancing Vehicle Positioning Data Through Map-Matching", Handbook of Intelligent Vehicles, Jan. 2012, 13 pages.

*Primary Examiner* — Anne Marie Antonucci
*Assistant Examiner* — Patrick M Brady
(74) *Attorney, Agent, or Firm* — Peter H. Yu; HERE GLOBAL B.V.

(57) ABSTRACT

An approach is provided for aggregating an incident route based on high-resolution sampling. The approach involves receiving location data points representing a path traveled. The approach also involves generating an initial link set comprising a first predetermined number of traveled link options based on an initial location data point. The approach further involves determining a second predetermined number of probable matching road links of the geographic database for a next location data point. The approach further involves computing probabilities for respective pairs of the traveled link options and the probable matching road links. Each probability indicates a pair of a likelihood that a traveled route option and a probable matching road link are connected. The approach further involves aggregating the respective pairs to reduce a number of the respective pairs into the first or another predetermined number of traveled link options of a new link set based on the probabilities.

15 Claims, 15 Drawing Sheets

(56) References Cited

U.S. PATENT DOCUMENTS

| | | | |
|---|---|---|---|
| 2012/0226391 A1* | 9/2012 | Fryer | G01C 21/3407 |
| | | | 701/1 |
| 2014/0114563 A1* | 4/2014 | Newson | G01C 21/3484 |
| | | | 701/518 |
| 2016/0379366 A1* | 12/2016 | Shah | G06T 7/50 |
| | | | 345/419 |
| 2017/0116850 A1* | 4/2017 | Kim | G08G 1/096866 |
| 2018/0188037 A1 | 7/2018 | Wheeler et al. | |
| 2019/0346572 A1* | 11/2019 | Fowe | G01S 19/06 |
| 2019/0360818 A1* | 11/2019 | Linder | G01C 21/30 |
| 2020/0018607 A1* | 1/2020 | Balu | H04W 12/02 |
| 2020/0208992 A1 | 7/2020 | Fowe | |
| 2020/0240801 A1 | 7/2020 | Zhang et al. | |
| 2021/0095971 A1 | 4/2021 | Mao et al. | |
| 2022/0011118 A1* | 1/2022 | Beggel | G06N 7/01 |

\* cited by examiner

FIG. 3A
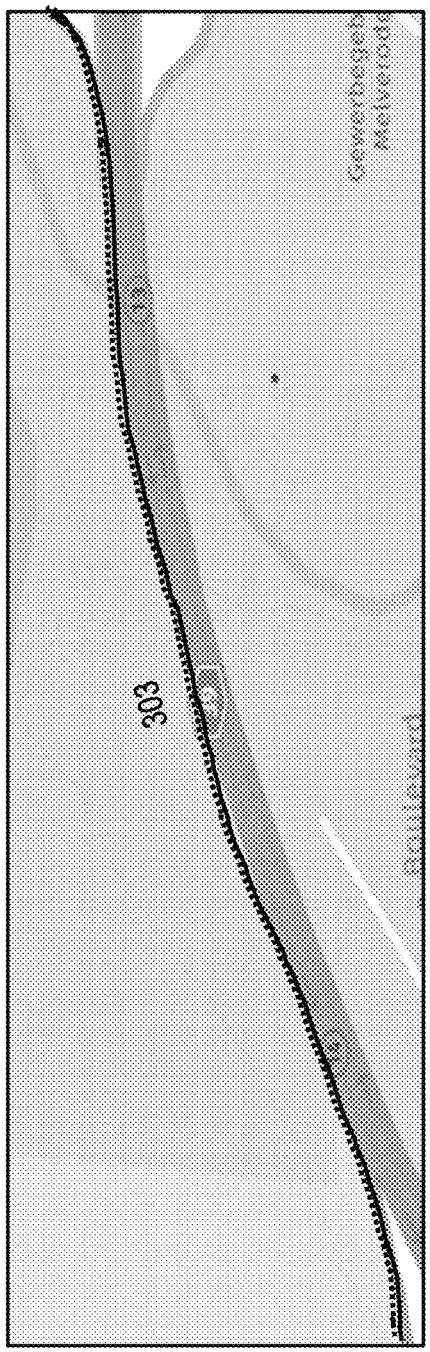
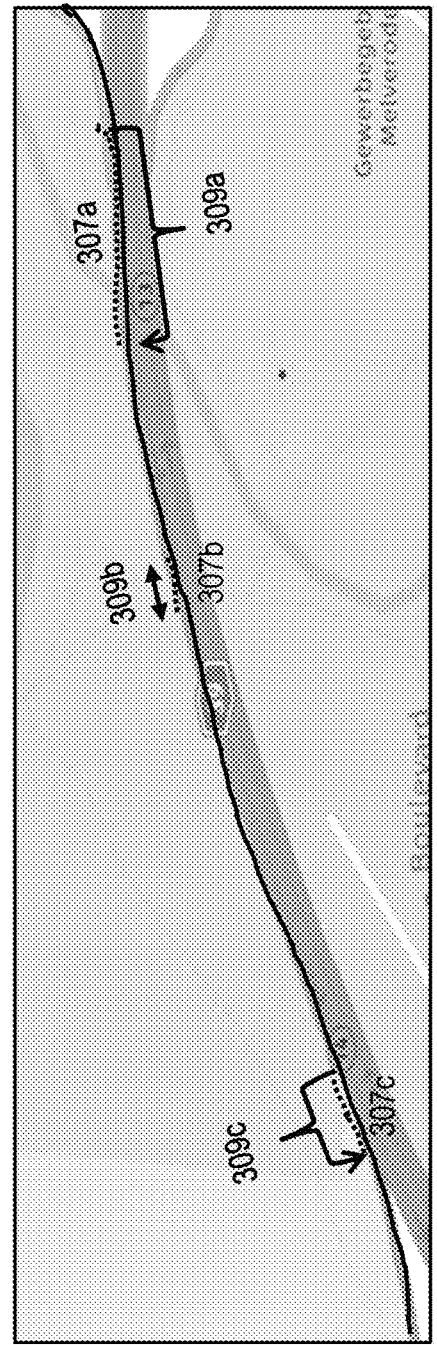

METHOD, APPARATUS, AND SYSTEM FOR AGGREGATING A ROUTE BASED ON HIGH-RESOLUTION SAMPLING

BACKGROUND

Providing data on traffic anomalies or incidents (e.g., abnormalities in traffic that can affect traffic flow such as construction zones, accidents, lane closures, road closures, etc.) is an important function for mapping service providers. However, the explosion of vehicle sensor data (e.g., from the autonomous vehicles) consumes more computing power and time to accurately and efficiently map-match all available vehicle location data to figure out a traveled route and a current location of a vehicle. For instance, Hidden Markov Model (HMM) map matching uses information from all trajectory points and then chooses the most likely path through the road network. Accordingly, mapping service providers face significant technical challenges to reduce computation in the existing probability-based route-builder methods while maintaining navigation accuracy and efficiency.

SOME EXAMPLE EMBODIMENTS

Therefore, there is a need for an approach for aggregating an incident route based on high-resolution sampling to reduce computation, such as high-density sampling (e.g., selecting a portion of the vehicle trajectory points near road link connecting locations that have high density of vehicle location data points), high-probability aggregation (e.g., reducing a number of traveled link options at a sampled high-density point based on respective probabilities), stopping criteria (e.g., for discarding inaccurate trajectory points), etc.

According to one embodiment, a method comprises receiving a sequence of location data points representing a path traveled in a geographic area. The method also comprises generating an initial link set comprising a first predetermined number of a plurality of traveled link options based on an initial location data point of the sequence. Each of the plurality of traveled link options respectively comprises one or more road links of a geographic database to which the initial location data point is matched. The method further comprises determining a second predetermined number of a plurality of probable matching road links of the geographic database for a next location data point of the sequence. The method further comprises computing a plurality of respective probabilities for a plurality of respective pairs of (i) the plurality of traveled link options and (ii) the plurality of probable matching road links. Each probability, from among the plurality of respective probabilities, respectively indicates a likelihood that a traveled route option and a probable matching road link of the respective pair are connected. The method further comprises aggregating the plurality of respective pairs to reduce a number of the plurality of respective pairs into the first predetermined number or another predetermined number of traveled link options of a new link set based on the plurality of respective probabilities.

According to another embodiment, an apparatus comprises at least one processor, and at least one memory including computer program code for one or more computer programs, the at least one memory and the computer program code configured to, with the at least one processor, cause, at least in part, the apparatus to receive a sequence of location data points representing a path traveled in a geographic area. The apparatus is also caused to generate an initial link set comprising a first predetermined number of a plurality of traveled link options based on an initial location data point of the sequence. Each of the plurality of traveled link options respectively comprises one or more road links of a geographic database to which the initial location data point is matched. The apparatus is further caused to determine a second predetermined number of a plurality of probable matching road links of the geographic database for a next location data point of the sequence. The apparatus is further caused to compute a plurality of respective probabilities for a plurality of respective pairs of (i) the plurality of traveled link options and (ii) the plurality of probable matching road links. Each probability, from among the plurality of respective probabilities, respectively indicates a likelihood that a traveled route option and a probable matching road link of the respective pair are connected. The apparatus is further caused to aggregate the plurality of respective pairs to reduce a number of the plurality of respective pairs into the first predetermined number or another predetermined number of traveled link options of a new link set based on the plurality of respective probabilities.

According to another embodiment, a non-transitory computer-readable storage medium carries one or more sequences of one or more instructions which, when executed by one or more processors, cause, at least in part, an apparatus to receive a sequence of location data points representing a path traveled in a geographic area. The apparatus is also caused to generate an initial link set comprising a first predetermined number of a plurality of traveled link options based on an initial location data point of the sequence. Each of the plurality of traveled link options respectively comprises one or more road links of a geographic database to which the initial location data point is matched. The apparatus is further caused to determine a second predetermined number of a plurality of probable matching road links of the geographic database for a next location data point of the sequence. The apparatus is further caused to compute a plurality of respective probabilities for a plurality of respective pairs of (i) the plurality of traveled link options and (ii) the plurality of probable matching road links. Each probability, from among the plurality of respective probabilities, respectively indicates a likelihood that a traveled route option and a probable matching road link of the respective pair are connected. The apparatus is further caused to aggregate the plurality of respective pairs to reduce a number of the plurality of respective pairs into the first predetermined number or another predetermined number of traveled link options of a new link set based on the plurality of respective probabilities.

According to another embodiment, an apparatus comprises means for receiving a sequence of location data points representing a path traveled in a geographic area. The apparatus also comprises means for generating an initial link set comprising a first predetermined number of a plurality of traveled link options based on an initial location data point of the sequence. Each of the plurality of traveled link options respectively comprises one or more road links of a geographic database to which the initial location data point is matched. The apparatus further comprises means for determining a second predetermined number of a plurality of probable matching road links of the geographic database for a next location data point of the sequence. The apparatus further comprises means for computing a plurality of respective probabilities for a plurality of respective pairs of (i) the plurality of traveled link options and (ii) the plurality of probable matching road links. Each probability, from among the plurality of respective probabilities, respectively indicates a likelihood that a traveled route option and a probable matching road link of the respective pair are connected. The apparatus further comprises means for aggregating the plurality of respective pairs to reduce a number of the plurality of respective pairs into the first predetermined number or another predetermined number of traveled link options of a new link set based on the plurality of respective probabilities.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3E are diagrams illustrating example scenarios for aggregating an incident route based on high-resolution sampling, according to example embodiments;

DESCRIPTION OF SOME EMBODIMENTS

Examples of a method, apparatus, and computer program for aggregating an incident route based on high-resolution sampling are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
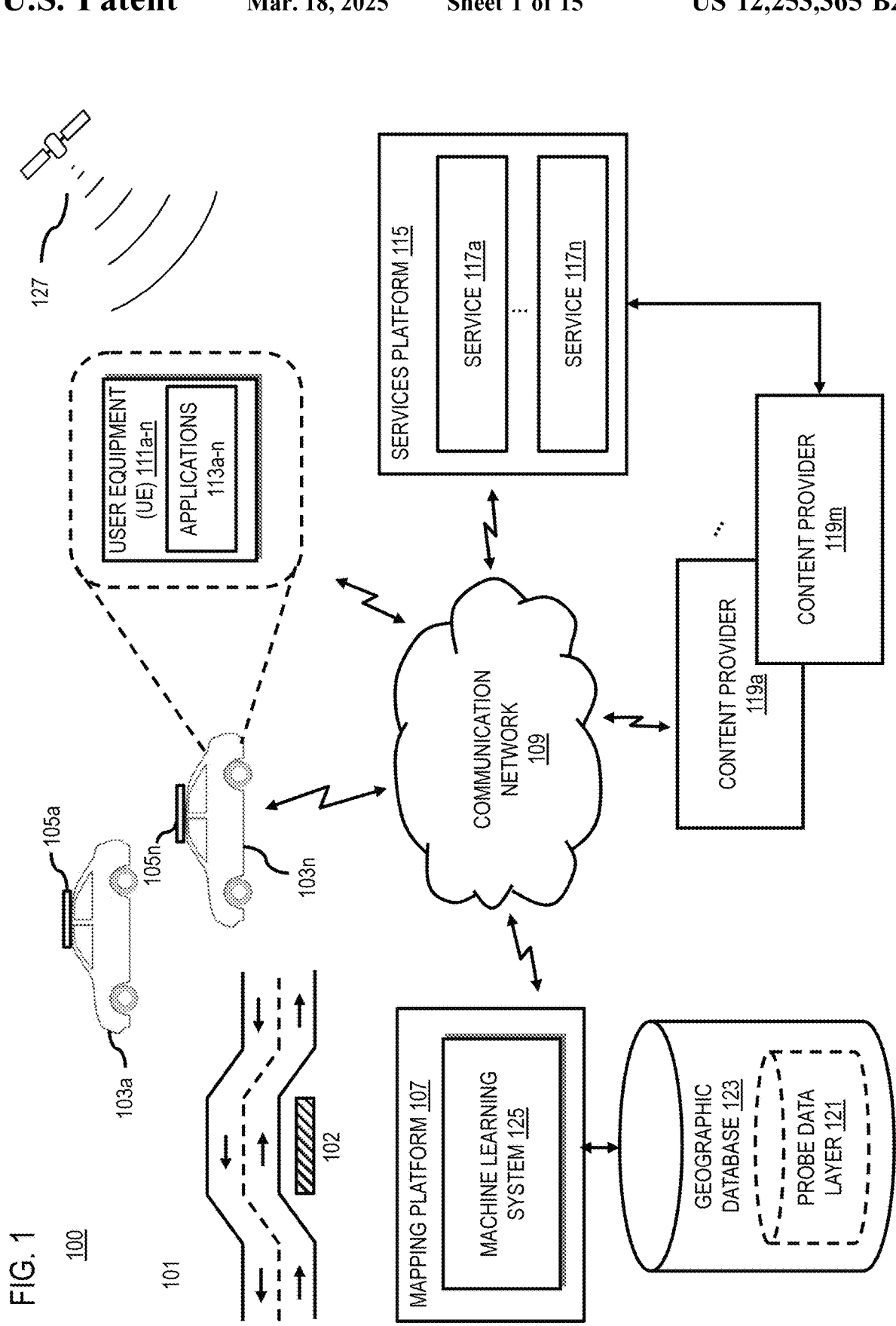
FIG. 1 is a diagram of a system capable of aggregating an incident route based on high-resolution sampling, according to example embodiment(s)

FIG. 1 is a diagram of a system 100 capable of aggregating an incident route based on high-resolution sampling to reduce computation, according to example embodiment(s). As mentioned above, providing data on traffic anomalies or incidents (e.g., abnormalities in traffic that can affect traffic flow such as accidents, lane closures, road closures, etc.) is an important function for mapping service providers. Real-time road incident information can provide the drivers the most up-to-date pre-warning of road closure and re-routing accordingly.

Currently, vehicle sensors can be employed to detect and/or report road incidents. The location data (e.g., vehicle trajectory data) among the vehicle sensor data points can be map-matched onto a road network to determine the vehicle trajectory on a map, and then the incident location(s) can be flag on the map. However, the existing probability-based route-builders, such as those apply Hidden Markov Model (HMM) of the like involving computationally expensive operations including transition probability calculation for a shortest path routing between each pair of candidate road links.

On the other hand, traditional tree-based searching creates even more candidate road links, and consequently requires more computing power in high-density location data than that in low-density location data. As such, how to aggregate the candidate road links in the process of route-builder based on the traditional tree-based searching becomes an even bigger problem.

To address these problems, the system 100 of FIG. 1 introduces a capability aggregating an incident route based on high-resolution sampling to reduce computation, such as high-density sampling, high-probability aggregation, stopping criteria, etc. In one embodiment, the system 100 can implement an example process depicted in FIG. 2.

Figure 2:
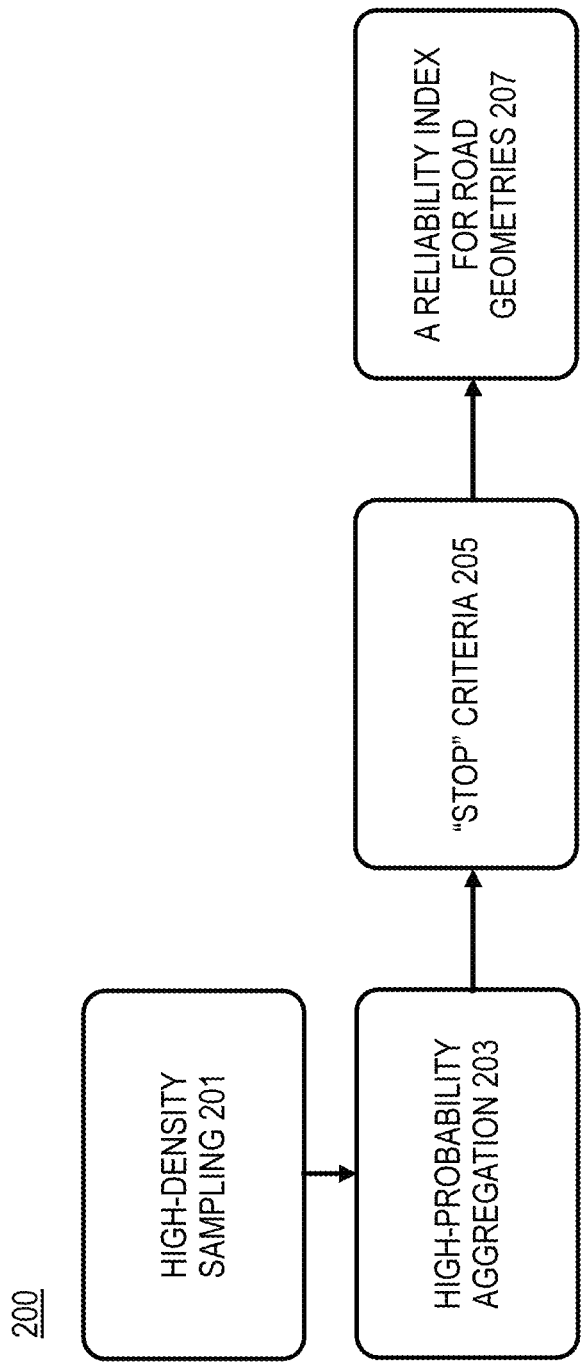
FIG. 2 is a flowchart of a process 200 for aggregating an incident route based on high-resolution sampling, according to example embodiment(s)

FIG. 2 is a flowchart of a process 200 for aggregating an incident route based on high-resolution sampling, according to example embodiment(s). In one embodiment, the system 100 can extract vehicle location points from vehicle trajectory data near road link connecting locations (e.g., road link starting points, end points, etc.) thereby selecting candidate road links based on the extracted vehicle location points in step 201 ("high-density sampling"). This technique can limit the subsequent processing to the high-density vehicle location data points, thereby reducing computing resources/time while maintain a high accuracy for route building by the high-density vehicle locations.

The system 100 can then aggregate the selected candidate road links to build traveled routes for the extracted high-density vehicle location points (e.g., dense location data sampling one location point per second or per 0.1 second) by reducing the candidate road links into a predetermined number (smaller than a total number of the candidate road links), thereby reducing computing resources/time in route building in step 203 ("high-probability aggregation"). This technique can limit the processing to the predetermined/ smaller number of candidate road links thereby reducing computing resources/time. In addition, the system 100 can discard inaccurate trajectory points based one or more stopping criteria in step 205, and/or generate a reliability index for road geometries based on the incident route in step 207.

Therefore, the system 100 can build an incident route with degradation in a way that shrink the size of probable link combinations, thereby provide a robust and real-time reliability index of road geometries/incidents, that can be used for road incident detection, map data updates, ETA calculation, traffic, city planning, etc., thereby enhancing or increasing safety, predictability, road accessibility, etc.

Beside the vehicles 103, the system 100 can provide apply the process of FIG. 2 to other modes of transport, such as walking, bicycles (e.g., detecting incidents such as pedestrian walking on bike lane(s) slowly thereby clogging the bike lane). By way of example, the system 100 can apply the process of FIG. 2 to indoor/outdoor pedestrian trajectory data (e.g., cross walkways, malls, etc.) to update pedestrian indoor/outdoor map data, report incidents (e.g., inattentive pedestrians staring at smartphones thereby clogging the walkways), etc.

Figure 3B:
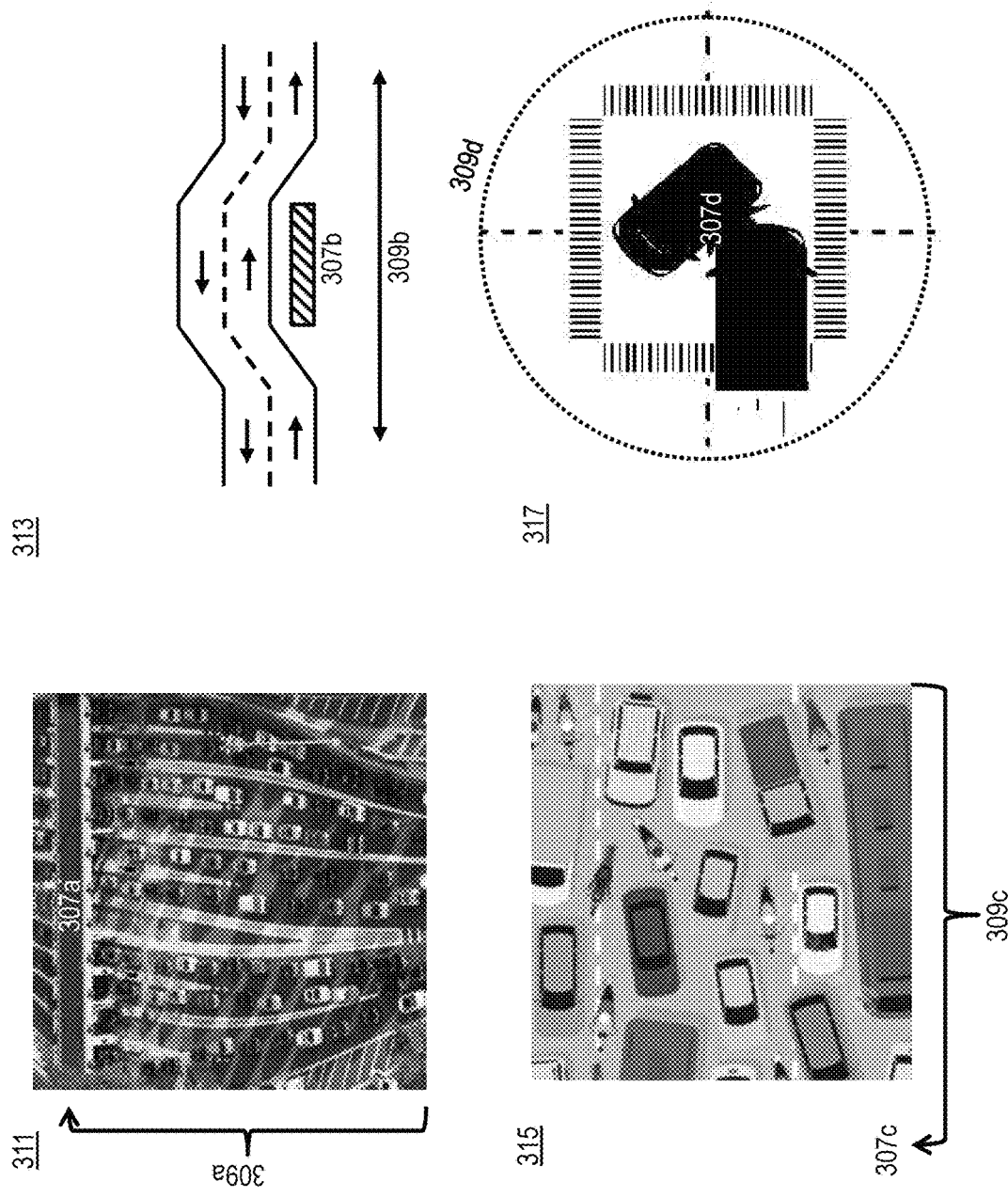

FIGS. 3A-3E are diagrams illustrating example scenarios for aggregating an incident route based on high-resolution sampling, according to example embodiments. Corresponding to the high-density sampling step 201 of the process 200, FIG. 3A depicts a diagram 301 including a vehicle trajectory 303 and a diagram 305 including start and end locations 307 (e.g., sampled vehicle location data points) of the vehicle trajectory 303 (e.g., raw vehicle location data points). For instance, the vehicle trajectory 303 is already tagged with one or more road incident labels (e.g., a construction zone) based on vehicle sensor data (e.g., Light Detection and Ranging (LiDAR)). As another instance, the vehicle trajectory 303 is already tagged with one or more road incident labels based on satellite images, drive files, community feedbacks, third party reference sources, imagery, etc. Some mapping processes can detect a road incident using video drive files, and then code the road incident. By way of example, a video drive file can be captured by a vehicle camera, one or more infrastructure sensors (e.g., traffic reporting cameras), etc. By way of example, the infrastructure sensors may be configured to use any sensing technology (e.g., visible light camera sensors, Bluetooth, infrared sensors, LiDAR sensors, radar sensors, acoustic sensors, and the like).

The system 100 can build a travelled incident route based on vehicle trajectory data tagged with one or more road incident labels, and identify what (e.g., low liability portion(s)) needs to be updated in the route. Using the process 200 of FIG. 2, the system 100 can expedite the learning of low confidence/reliability portion(s) of an incident route, update link and/or map confidence for subsequent map updates, without calculating all possible link combinations on an incident route. For instance, the system 100 can first sample locations near topology ends with a known order, e.g., location 1 to location 100, and get all the links in-between based on connecting probability. As another instance, the system 100 can start with a location N instead of the location 1 based on, for example, its higher probability of road incident(s) such as a well-known traffic jam city center. In the latter case, the system 100 can process upstream and downstream from the location N in parallel to accelerate the processing. To connect from downstream to upstream, the system 100 can adjust the heading data. After the adjustment, the incident routes built via the later approach can be the same of very similar to the result form the first approach.

As yet another instance, the system 100 can start from the location 1 toward the location 100 as well as from the location 100 toward the location 1 to accelerate the processing. As another instance, the system 100 can start from multiple locations such as the location N, a secondarily preferred location M, etc., to process upstream and downstream to accelerate the processing even further. The number of possible sampling strategies to accelerate the processing is numinous, and is not limited to time-sequenced locations For instance, the system 100 can extract the start and end locations 307 in the diagram 305 from the vehicle trajectory 303 in the diagram 301 as the extracted vehicle location points in step 201 (i.e., the high-density/sampled vehicle location points). Such high-density sampling is built on the assumption that the route building results are mostly affected by the probable links for vehicle locations near road link start/end points, such as intersections, roundabouts, toll stops, bridges, tunnel ends, highway entries/exits, etc. where roads split into multiple candidate road links or vis versa. The vehicle sampling is effective for the high-density vehicle location points.

For instance, the system 100 can use each of these start/end location points 307 to calculate an offset 309 of a road incident (e.g., construction zones, accidents, lane closures, road closures, etc.) on a road link. FIG. 3B illustrating diagrams of example road incidents occurred at road link start/end locations, according to example embodiment(s). For example, a diagram 311 shows a traffic jam before a toll stop 307a with an offset 309a therefrom, a diagram 313 shows a detour due to a construction zone 307b with an offset 309b therefrom, and a diagram 315 shows a traffic jam before a highway exit 307c with an offset 309c therefrom (also shown in the diagram 305 of FIG. 3A). As another example, a diagram 317 shows an accident at an intersection 307d with an offset 309d therefrom (not shown in the diagram 305 of FIG. 3A). Second, the other vehicle locations that are close to link start/end will be extracted as sampled vehicle locations. Those are far from the link start/end will be discarded. The two steps are as illustrated below.

Figure 3C:
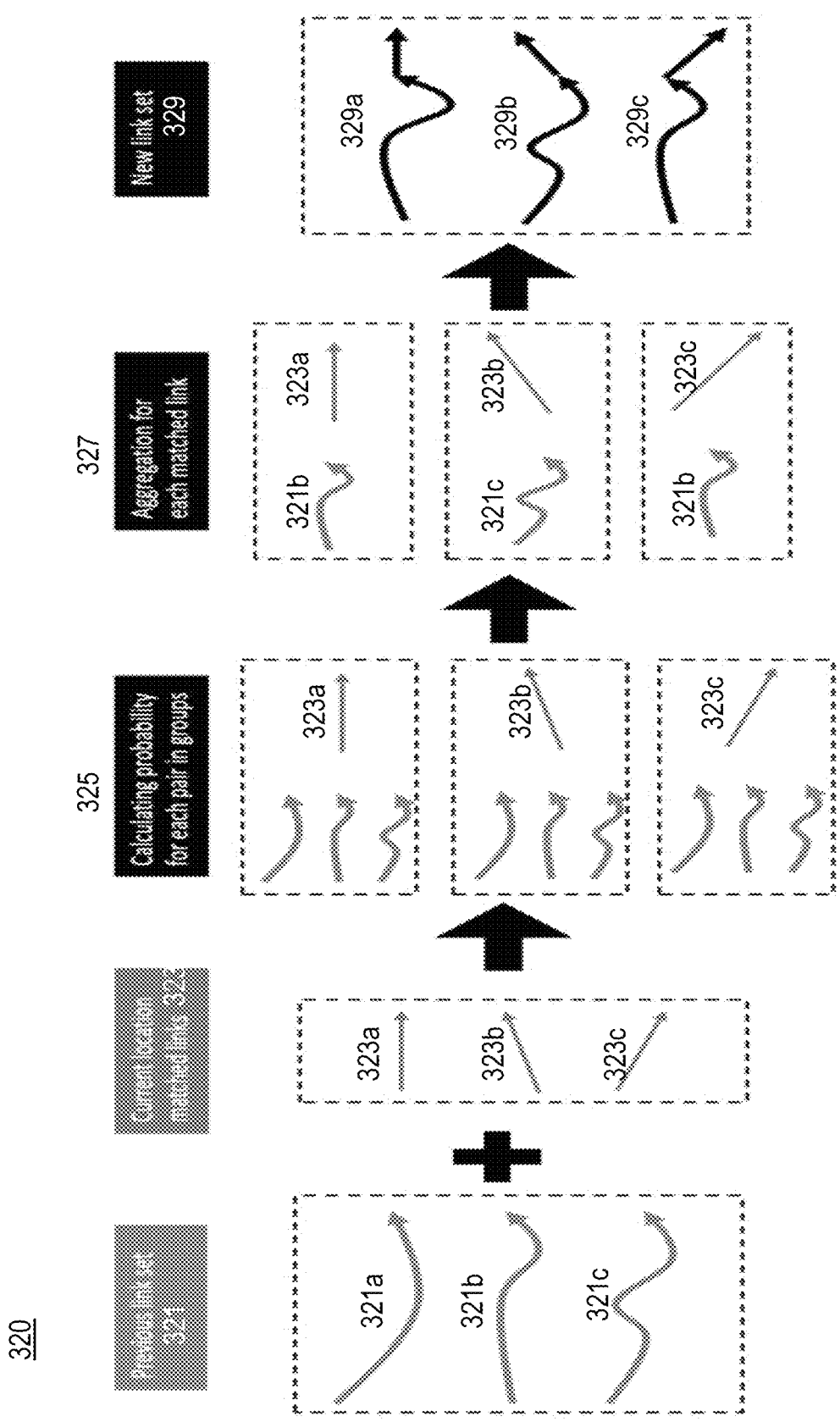

Corresponding to the high-probability aggregation step 203 of the process 200, FIG. 3C depicts a route building via aggregation process 320. In the process 320, the system 100 can first find a probable link set 323 for each of the sampled vehicle location points 307 (e.g., the construction zone 307b) using a point-based map-matcher. The point-based map-matcher can be well calibrated to employ attributes of a single vehicle location point (e.g., location, heading, speed, functional class, etc.) to generate one or more probable matched links. For instance, there may be more than one probable links when the vehicle location point is near an intersections, a split/merge or parallel roads.

In the next step, the system 100 can connect the probable links between nearby vehicle location points to build a route. The route building process starts from the first two of the vehicle location points 307 and continuously aggregates probability of each link pairs (e.g., a possible connection) until the last vehicle location point.

In the widely used map-matching model Hidden Markov Model (HMM), consecutive vehicle location points are distant from each other (e.g., a few hundred meters or longer) and it needs to record nearly all the possible combinations. HMI regards each trajectory as an observation, while the vehicle actual location on the road is unknown (the hidden states). HMI assumes all road links near the observation can be the actual vehicle location/state, and calculates an emission probability for each of the road links. In contrast, the system 100 only process the sampled vehicle location points 307 (i.e., a subset of all available vehicle location points), because the high-density vehicle location points (e.g., sub-meters, centimeters, etc.) are very close to each other and the combinations of probable links are limited. On the other hand, since the system 100 uses high-density vehicle location data points, the system 100 does not keep a link set of all possible combinations of probable links between every two vehicle location data points, to avoid dramatically increasing the link set. In one embodiment, the system 100 aggregates links between two vehicle location points to shrink/reduce the size of the probable link combination.

In one embodiment, when the sampled vehicle location point is a 4-way intersection and the system 100 can use any number smaller than all available number, such as three) of more probable prior/upstream links with the finite number of more probable next/downstream links at the intersection as three most probable pairs as in FIG. 3C to reduce computation of all possible combinations as in HMI. On the other hand, the system 100 does not put all eggs in one basket by using just use one (e.g., the most probable link/pair), that misses all other probable group/pairs and may end up with the wrong route after processing. For instance, the system 100 starts with three pairs then aggregates with three more downstream links into secondary three pairs, that keeps the probable routes as a finite number, while maintaining information of lower probability choices (neither one nor infinite possibility like HMM).

As shown in FIG. 3C, the route building will iterate the process of connecting a previous link set 321 and probable matched links 323 of a current vehicle location point 307. First, the system 100 can calculate probability values of all possible combinations of the previous link set 321 (e.g., including previous links 321a, 321b, 321c) and the probable matched links 323 (e.g., including probable matched links 323a, 323b, 323c) in step 325.

Second, for each probable matched link 323 of the current vehicle location point 307, the system 100 can extract one of the previous links with the highest combined probability based on distances, heading differences, etc. A combined probability can be calculated by multiplying the probability of the first event by the probability of the second event. For example, when the probability of the previous link 321a is 2/5 and the probability of the probable matched link 323a is 1/4 then the probability of both events happen is (2/5)*(1/4) =2/20=1/10.

The probability values (e.g., 2/5, 1/4, etc.) of a link can be determined based on link attributes such as location, heading, speed, functional class, etc. using heuristic selection, machine learning, etc. For example, the closer two ends of two links are (e.g., as determined by a link end distance), the more likely the links are connected thus a higher probability value for the link connection. On the other hand, the closer two generally parallel links are (e.g., as determined by a link distance), the less likely the links are connected. In term of headings, the less a heading difference (e.g., 0-180 degrees) between two links, the more likely the links are connected. In term of road link functional class (e.g., arterial, collector, local, express way, etc.), links of the same functional class or closer functional classes, the more likely the links are connected. In term of road link speed category (e.g., express way, local, etc.), links of the same functional speed category or closer speed category, the more likely the links are connected.

In FIG. 3C, the previous link 321b has the highest combined probability with the probable matched link 323a, as well as with the probable matched link 323c, while the previous link 321c has the highest combined probability with the probable matched link 323b. The system 100 then can aggregate highest combined probability pairs into a new link set 329 in step 327. The route building will continue to the next vehicle location point (e.g., vehicle location point 307c).

In FIG. 3C, the number of the link set is limited to three in the current iteration. For the next iteration(s), the number of the link set can fixed as three such that the final output will be three. As another instance, the number of the link set can vary for different iteration(s), while containing the route number of the final output to a reasonable number. The aggregation process 320 can be iterated to subsequent vehicle location points to prevent that the size of the output routes from increasing exponentially, thereby saving computing resources.

The number of sampling can be fixed via one processing pipeline, such as 3, or can change to propagate to different locations of different characteristics. For example, into 6 at a 7-way intersection. The bigger the sample number, the more accurate results yet costs more computation. As another example, the system 100 can select top link options with a probability valve more than 10%, such that the sampled link number may be 4 or 3. The sampled link number can vary the options from point to point, yet still contained relative to the prior art considering all link options (e.g., all links to the intersection). Even if selecting 6 out of 7 links at the 7-way intersection each has a probability value>90% since they are close to each other, the stem 100 still cannot exponentially increase the number of possible links, as long as the number is less than all links at that location.

Figure 3D:
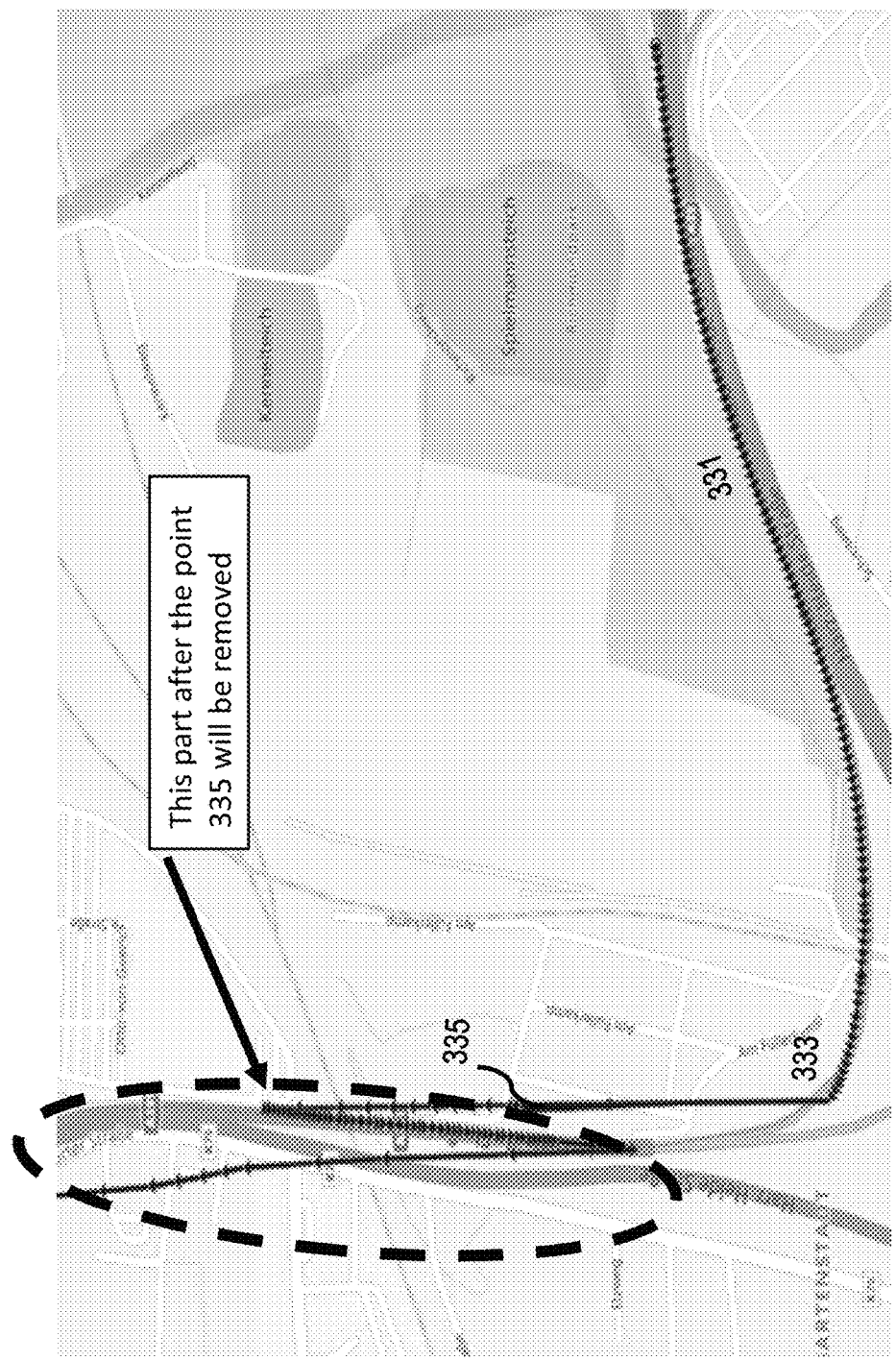

Corresponding to the discard step 205 of the process 200, FIG. 3D depicts an example of discarded inaccurate trajectory points in a vehicle trajectory 331 based one or more stopping criteria. Due to the GPS errors or other vehicle on-board sensor errors, some of the vehicle location points may not be accurate. By way of example, a trajectory sometimes may contain unnecessary detours, which happens when the trajectory sampling rate is very high and two consecutive trajectory sections being too close to each other to be matched to the upper stream of its preceding point. In this case, the stopping criterion can be that: when probable matched links of the current vehicle location point (e.g., a vehicle location point 335) is not connected to any previous link (e.g., of a vehicle location point 333), the system 100 can stop the route building and discard all the vehicle location points (e.g., the portion of the vehicle trajectory 331) after the current vehicle location point 335.

Such criterion works well for high-density vehicle location points where there is no short gap in the vehicle trajectory 331 that does not match with any vehicle location points. In FIG. 3D, there is a clear zig-zag in the vehicle trajectory 331 and some vehicle location points in the vehicle trajectory 331 are matched to the opposite freeway by mistake. Consequently, there are two consecutive vehicle location points 333, 335 in the middle of the vehicle trajectory 331 whose probable matched links are not connected such that the system 100 can stop the route building.

Figure 3E:
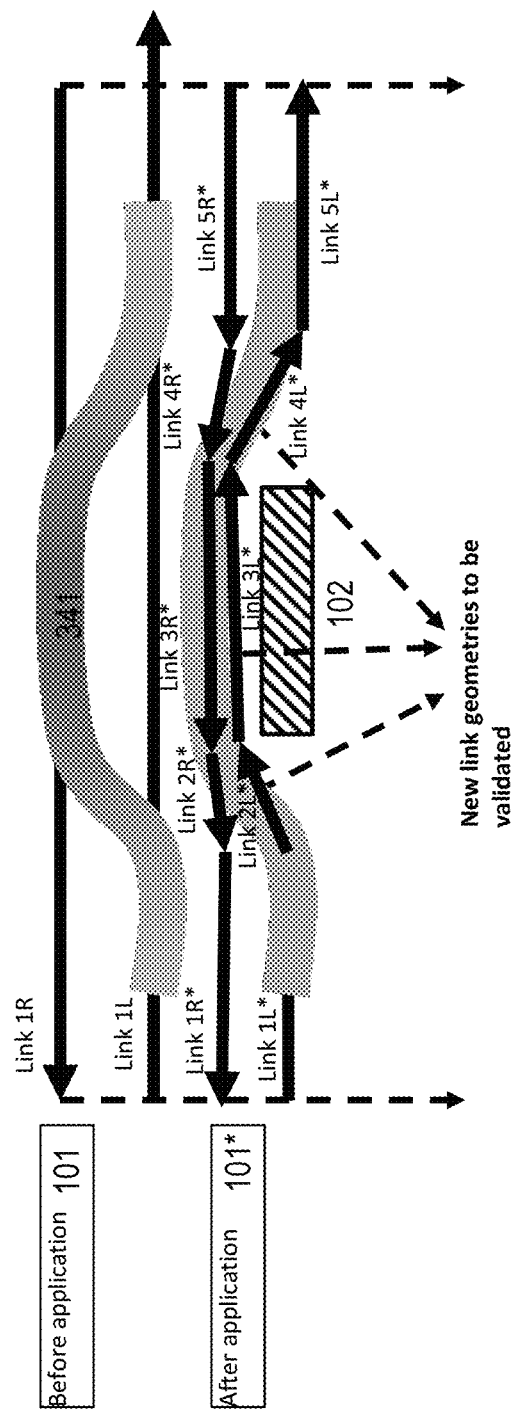

Corresponding to the discard step 207 of the process 200, FIG. 3E depicts an application scenario of a route builder based on the process 200 in FIG. 2. For instance, the system 100 can validate a road geometry based on an incident route determined based on the discussed embodiments. For instance, the existence of a road incident 102 (e.g., a construction zone) on a road (e.g., a road link 101) as discussed can indicate a low reliability of the map data. The road geometries built based on vehicle sensor data on these road links can be less reliable. The location sensor data errors may include atmospheric interference, calculation and rounding errors, ephemeris (orbital path) data errors, multipath effects, etc. This is commonly seen during a chicane scenario (e.g., due to the construction zone) as shown in FIG. 3E. For instance, construction on the freeway can close a one-directional link and merge the traffic in the opposite-direction link (e.g., a chicane 341). In one embodiment, the map links (e.g., Link 1R, Link 1L) can remain the same as before application of the process 200. In another embodiment, the map links (e.g., Link 1R*-Link 5R*, Link 1L*-Link 5L*) are updated/changed with a new link geometry after application of the process 200. In this case, the links (e.g., Link 1R*-Link 5R*, Link 1L*-Link 5L*) with the matched construction route 101* can have lower reliability and require validation. The system 100 can generate a reliable index based on the matched incident route data, assign confidence to the road geometry and/or road incident (e.g., a construction zone), and validate/update the map data at the lower reliability/confidence portion(s). Other examples of road incidents may be signs, billboards, dividers, curbs, medians, lane marking, road boundary, other route-based attributes or furniture features for transportation, autonomous driving, or other applications.

Therefore, the system 100 can determine an incident route which the vehicle has taken based on high-density vehicle location data, and update road incidents/events (e.g., roadwork/construction, traffic accidents, traffic jams, etc.) on a road network, thereby providing high-quality map data as well as incident information for high-throughput and low latency.

The positioning sensors can apply various positioning technologies, e.g., global navigation satellite systems (GNSS), WiFi, Bluetooth, Bluetooth low energy, 2/3/4/5G cellular signals, ultra-wideband (UWB) signals, etc., and various combinations of the technologies to derive probe location data of different accuracy levels. By way of example, a combination of satellite and network signals can derive a more precise vehicle location than either one of the technologies, which is important in many of the intermodal scenarios, e.g., when GNSS signals are unavailable in subway stations.

It is noted that the term "road incident" refers to any occurrence on a roadway that impedes normal traffic flow. As such, road incidents include any recurring or non-recurring events that cause a reduction of roadway capacity or an abnormal increase in demand, such as road closures, traffic crashes, disabled vehicles, spilled cargo, highway maintenance and reconstruction projects, road furniture (e.g., signs, billboards, dividers, curbs, medians, lane marking, etc.) and special non-emergency events (e.g., ball games, concerts, or any other event that significantly affects roadway operations). Although various embodiments are described with respect to a constriction zone, it is contemplated that the approach described herein may be used with other road incidents. In addition, the terms "vehicle trajectory," "vehicle location data points" and "probe data" are used interchangeably via the disclosure.

In one embodiment, the system 100 can determine a road incident 102 (e.g., a construction zone) on a road link 101 by processing sensor data (including vehicle trajectory data) from one or more vehicles 103a-103n (also collectively referred to as vehicles 103) (e.g., standard vehicles, autonomous vehicles, heavily assisted driving (HAD) vehicles, semi-autonomous vehicles, etc.). In one instance, the vehicles 103 include one or more vehicle sensors 105a-105n (also collectively referred to as vehicle sensors 105) (e.g., positioning sensors) and have connectivity to a mapping platform 107 via a communication network 109. In one embodiment, the sensor data includes probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one embodiment, the system 100 can also collect probe data from one or more user equipment (UE) 111a-111n (also collectively referenced to herein as UEs 111) associated with the vehicles 103 (e.g., an embedded navigation system), a user or a passenger of a vehicle 103 (e.g., a mobile device, a smartphone, a client terminal, etc.), or a combination thereof. In one instance, the UEs 111 may include one or more applications 113a-113n (also collectively referred to herein as applications 113) (e.g., a navigation or mapping application). In one embodiment, the system 100 may also collect the probe data from one or more other sources such as government/municipality agencies, local or community agencies (e.g., police departments), and/or third-party official/semi-official sources (e.g., the services platform 115, one or more services 117a-117n, one or more content providers 119a-119m, etc.). In one instance, the probe data collected by the vehicle sensors 105, the UEs 111, one or more other sources, or a combination thereof may be stored in a probe data layer 121 of a geographic database 123 or a combination thereof.

Figure 4:
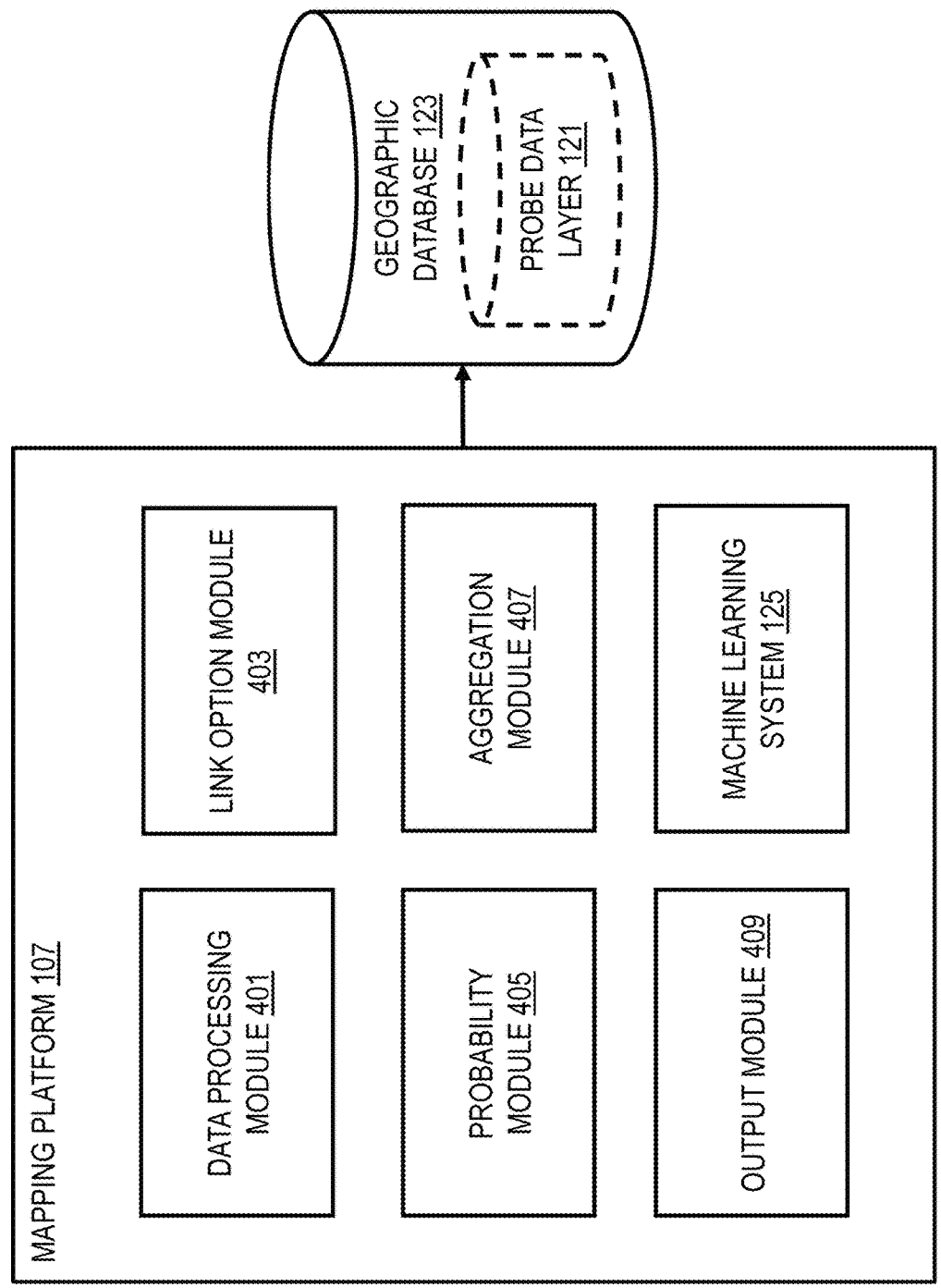
FIG. 4 is a diagram of the components of a mapping platform configured to aggregate an incident route based on high-resolution sampling, according to example embodiment(s)

FIG. 4 is a diagram of the components of the mapping platform 107, according to example embodiment(s). By way of example, the mapping platform 107 includes one or more components for aggregating an incident route based on high-resolution sampling, according to the various embodiments described herein. It is contemplated that the functions of these components may be combined or performed by other components of equivalent functionality. In one embodiment, the mapping platform 107 includes an data processing module 401, a link option module 403, an probability module 405, an aggregation module 407, an output module 409, and a machine learning system 125, and has connectivity to the geographic database 123 including the probe data layer 121. The above presented modules and components of the mapping platform 107 can be implemented in hardware, firmware, software, or a combination thereof. Though depicted as a separate entity in FIG. 1, it is contemplated that the mapping platform 107 may be implemented as a module of any other component of the system 100. In another embodiment, the mapping platform 107 and/or the modules 401-409 may be implemented as a cloud-based service, local service, native application, or combination thereof. The functions of the mapping platform 107, the machine learning system 125, the modules 401-409, and/or edge devices (e.g., UEs 111) are discussed with respect to FIGS. 2-6.

Figure 5:
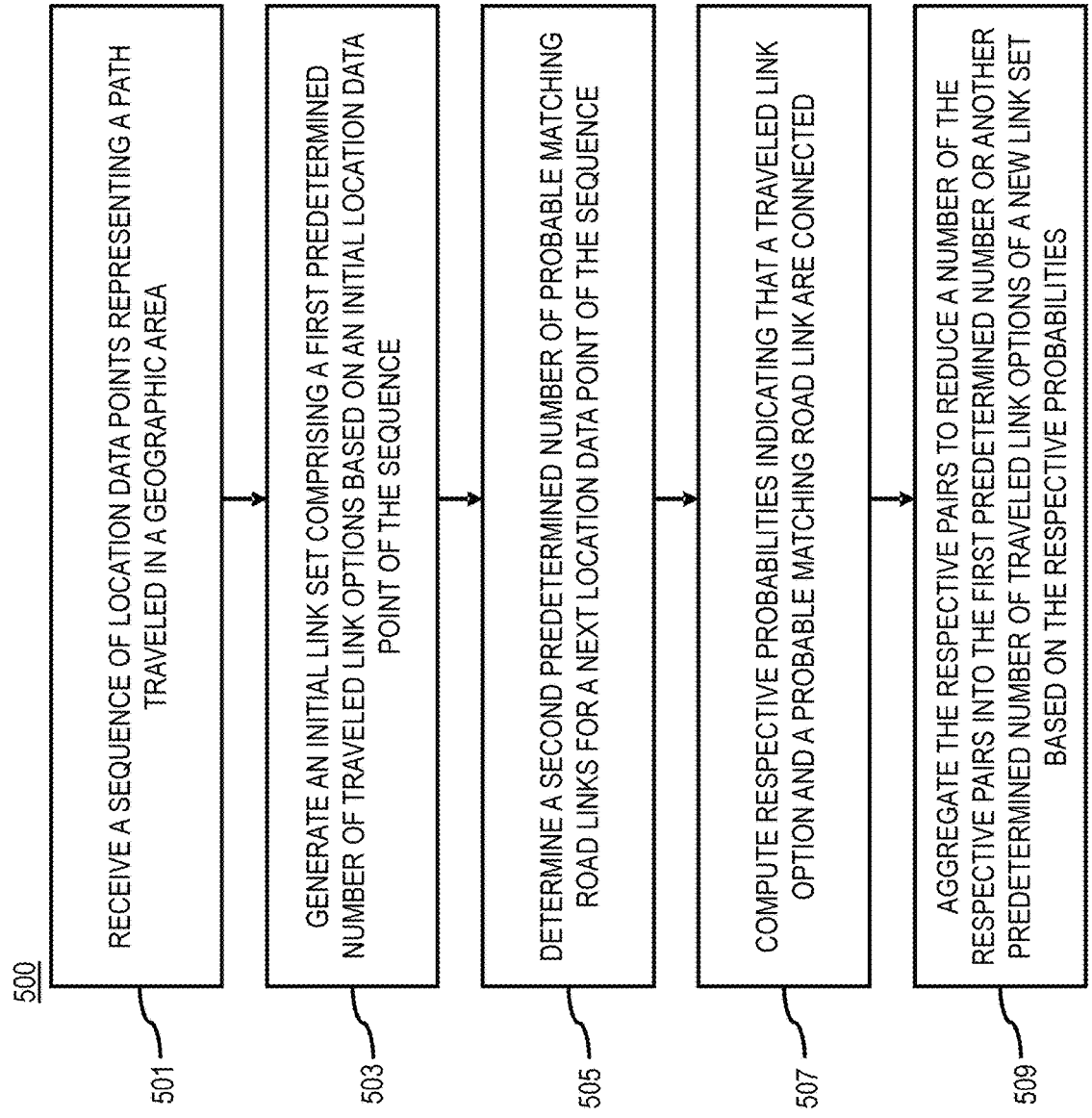
FIG. 5 is a flowchart of a process for aggregating an incident route based on high-resolution sampling, according to example embodiment(s)
Figure 9:
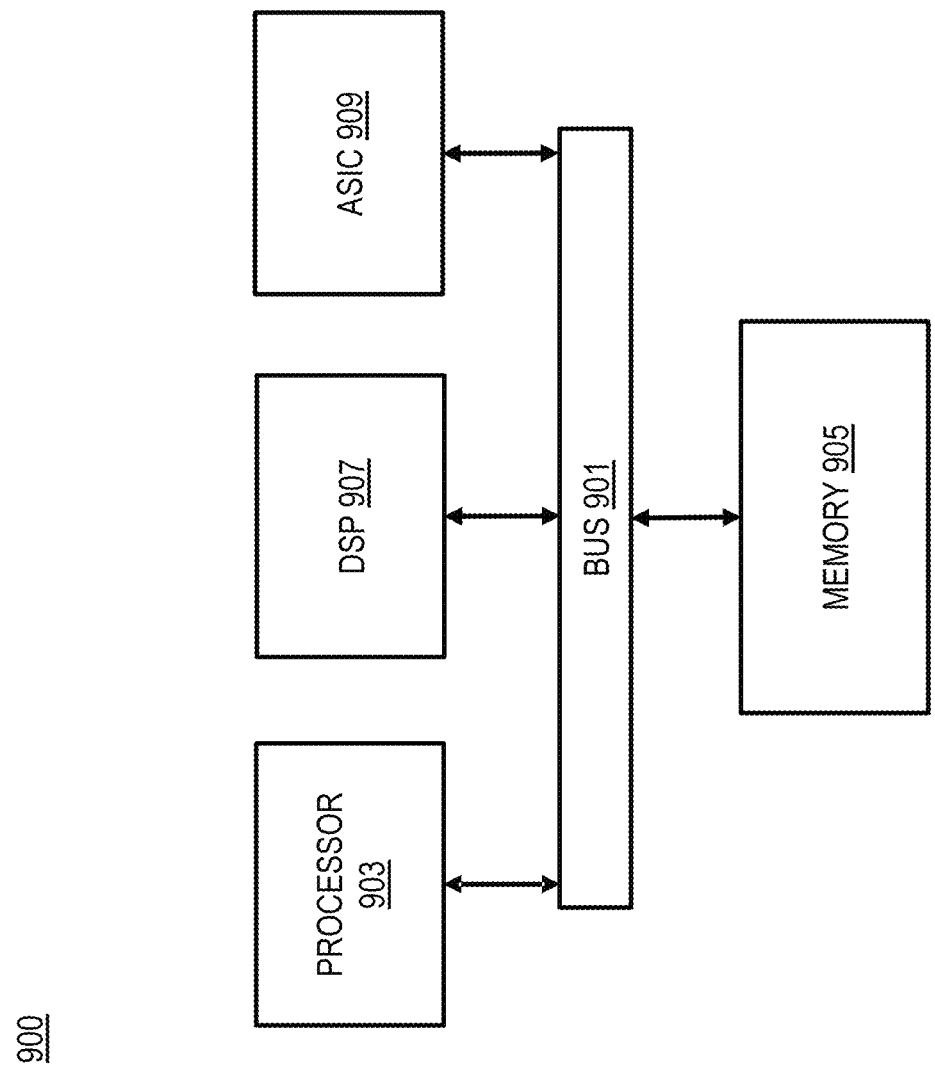
FIG. 9 is a diagram of a chip set that can be used to implement an embodiment.

FIG. 5 is a flowchart of a process for aggregating an incident route based on high-resolution sampling, according to example embodiment(s). In various embodiments, the mapping platform 107, the machine learning system 125, and/or any of the modules 401-409 may perform one or more portions of the process 500 and may be implemented in, for instance, a chip set including a processor and a memory as shown in FIG. 9. As such, the mapping platform 107, the machine learning system 125, and/or the modules 401-409 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In one embodiment, for example, in step 501, the data processing module 401 can receive a sequence of location data points (e.g., start and/or end location point(s) 307 sampled from the vehicle trajectory 303 in FIG. 3A, such as the vehicle location point 307a) representing a path traveled in a geographic area. By way of example, the data processing module 401 can retrieve the vehicle trajectory 303 based on vehicle sensor data that probe data and road incident tag(s). As mentioned, the road incident tag(s) can be generated from LiDAR data, satellite images, drive files, community feedbacks, third party reference sources, imagery, etc. The probe data can be collected from vehicles 103 traveling on a road network that are susceptible to location sensor errors. In one embodiment, probe data includes raw position probes (e.g., probe points) sent from vehicles 103 indicating their respective locations by, for example, a latitude and longitude pair. In another embodiment, the probe data further includes altitude of respective locations that can be applied to distinguish vehicle trace points on multiple-level roads/bridges/interchanges.

In one embodiment, in step 503, the link option module 403 can generate an initial link set (e.g., the link set 321 in FIG. 3C) comprising a first predetermined number (e.g., three) of a plurality of traveled link options (e.g., links 321a-321c in FIG. 3C) based on an initial location data point of the sequence. Each of the plurality of traveled link options respectively comprises one or more road links of a geographic database (e.g., the geographic database 123) to which the initial location data point (e.g., the vehicle location point 307a) is matched.

In one embodiment, in step 505, the data processing module 403 can determine a second predetermined number (e.g., three) of a plurality of probable matching road links (e.g., current location matched links 323 in FIG. 3C) of the geographic database for a next location data point (e.g., the vehicle location point 307b) of the sequence. As discussed, the initial vehicle location point can be any vehicle location point in the sequence, to aggregate upstream and/or downstream individually or concurrently.

For instance, the plurality of probable matching road links (e.g., links 323a-323c in FIG. 3C) can be determined using a point-based map matcher. For real-time map matching a point-based map matcher is preferred over a path-based map matcher. A point-based map matcher calculates based upon the points prior to a given time (a compromise of performance over accuracy), as opposed to those of a whole journey, or upstream and downstream vehicle paths as does a path-based map matcher. Comparing to the point-based map-matcher, the path-based map-matcher needs to process tens or even hundreds more upstream and downstream vehicle location data points that is time-consuming and costly. With the increasing amount of vehicle location data points, the point-based map matcher is preferred for real-time processing.

In one embodiment, in step 507, the probability module 405 can compute a plurality of respective probabilities (e.g., according to the step 325 in FIG. 3C) for a plurality of respective pairs of (i) the plurality of traveled link options (e.g., links 321a-321c) and (ii) the plurality of probable matching road links (e.g., links 323a-323c). Each probability, from among the plurality of respective probabilities, respectively indicates a likelihood that a traveled route option (e.g., link 321b) and a probable matching road link (e.g., link 323a) of the respective pair are connected. For instance, the plurality of respective probabilities can be computed by the probability module 405 based on an existence of a connection between the one or more road links of the traveled link option and the probable matching road link in each of the plurality of respective pairs, one or more map attributes (e.g., location, heading, speed category, functional class, etc.) of the one or more road links of the traveled link option and the probable matching road link in each of the plurality of respective pairs, or a combination thereof.

In one embodiment, in step 509, the aggregation module 407 can aggregate the plurality of respective pairs to reduce a number of the plurality of respective pairs into the first predetermined number (e.g., three) or another predetermined number (e.g., any finite number small than the total link number available at the current vehicle location data point) of traveled link options of a new link set (e.g., the new link set 329 in FIG. 3C) based on the plurality of respective probabilities. The aggregating of the plurality of respective pairs can comprise extracting one of the plurality of traveled link options (e.g., link 321a) of the new link set respectively for each of the plurality of probable matching road links (e.g., links 323a, 323b, 323c) for the next location data point (e.g., the vehicle location data point 307b) in the sequence.

For instance, the plurality of traveled link options of the new link set can be generated by the aggregation module 407 via adding the one or more road links of the traveled route option and the probable matching road link in each of the plurality of respective pairs in the new link set (e.g., according to the step 327 in FIG. 3C).

In one embodiment, the data processing module 401 can iterate the determining of the second predetermined number of the plurality of probable matching road links, the computing of the plurality respective probabilities, the aggregating of the plurality of respective pairs, or a combination thereof in conjunction with the modules 403-407 for one or more subsequent location data points (e.g., the vehicle location data point 307*c*, etc.) of the sequence until a stopping criterion (e.g., among the stopping criteria 205) is met. For instance, the stopping criterion can include determining that the plurality of respective probabilities for the plurality of probable matching road links for the one or more subsequent location data points is below a threshold probability. For example, the stopping criterion can be when probable matched links of the current vehicle location point (e.g., a vehicle location point 335) is not connected to any previous link (e.g., of a vehicle location point 333) in FIG. 3D.

In one embodiment, the link option module 403 can select an output traveled link option from the plurality of traveled link options of the new link set (e.g., links 329*a*-329*c* in FIG. 3C) based on the plurality of respective probabilities associated with the plurality of traveled route options (e.g., one of the links 329*a*-329*c* with the highest probability). The output module 409 can then provide the output traveled link option as an output (e.g., for validity checks, map updates, etc.).

In one embodiment, the sequence of location data points (e.g., the vehicle location points 307) can be sampled by the link option module 403 from a larger set of location data points (e.g., the vehicle trajectory 303) based on an offset threshold (e.g., 309*a*-309*d* in FIG. 3B) from one or more start nodes, one or more end nodes, or a combination thereof of road link data stored in the geographic database (e.g., the geographic database 123).

By way of example, the data processing module 401 can process the sequence of location data points (e.g., the location data points 307), one or more characteristics of the sequence location data points (e.g., distance, heading difference, speed, functional class, etc.), other sensor data (e.g., LiDAR, drive file, etc.) associated with the sequence of location data points to determine one or more indications of a road incident, and flag the one or more road links of the initial link set (e.g., the link set 321), the new link set (e.g., the link set 329), or a combination thereof associated with the one or more indications of the road incident as low-reliability map data (e.g., to be validate/update manually and/or automatically using machine learning, etc.). The output module 409 can then initiate a map update, a validation, or a combination thereof the geographic database (e.g., the geographic database 123) based on the flagging.

In one embodiment, the output module 409 can cause a generation of a user interface (e.g., FIGS. 6A-6B), one or more instructions for operating an autonomous vehicle (e.g., the vehicle 103), or a combination thereof based on the map update, the validation, or a combination thereof. For instance, the user interface can depict a map representation, one or more navigation instructions, a navigation route, the road incident, or a combination thereof, and at least one of: (1) causing a presentation of the user interface on a device (e.g., UE 111), or (2) causing the autonomous vehicle (e.g., the vehicle 103) to execute the one or more instructions.

For instance, the output module 409 can provide the taken route data, road geometry data, and/or road incident data to the services platform 115 that provides, for example, mapping services, navigation services, road incident services, travel planning services, notification services, social networking services, content (e.g., audio, video, images, etc.) provisioning services, application services, storage services, contextual information determination services, location-based services, information-based services (e.g., weather, news, etc.), etc.

Figure 6A:
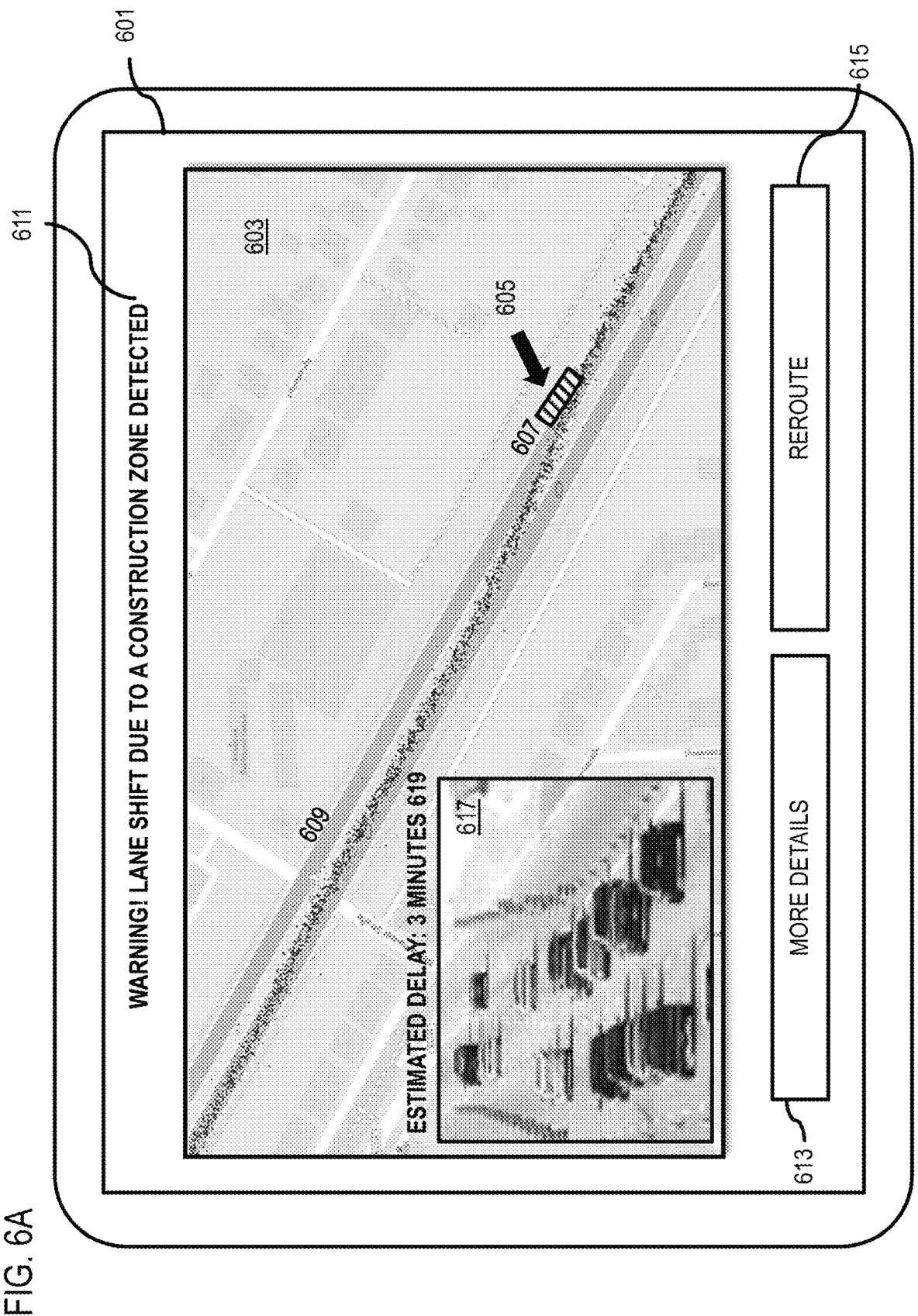
FIGS. 6A and 6B are diagrams of example user interfaces of a detected road geometry change and/or road incident, according to example embodiment(s)
Figure 6B:
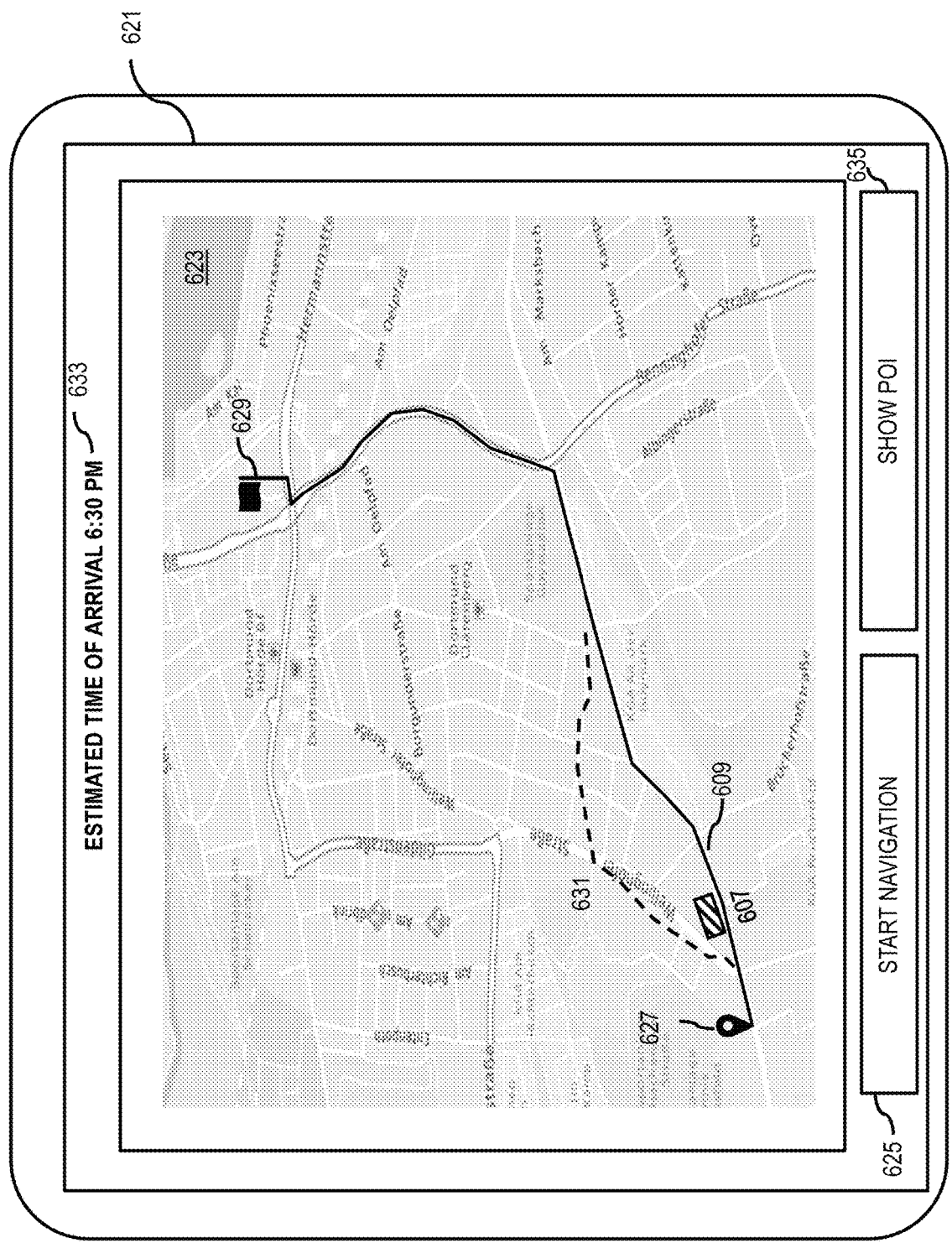

FIGS. 6A and 6B are diagrams of example user interfaces of a detected road geometry change and/or road incident, according to example embodiment(s). The user interface 601 in FIG. 6A (e.g., a navigation application 113) is generated for a UE 111 (e.g., a mobile device, an embedded navigation system, a client terminal, etc.). The user interface 601 in FIG. 6A shows a map 603, an arrow 605 pointing towards a road incident 607 detected as discussed on a road 609 in the map 603, and an alert 611: "Warning! Lane shift due to a construction zone detected." The user interface 601 also shows a "More Details" button 613 and a "Reroute" button 615. For examples, a user can interact with the user interfaces via one or more physical interactions (e.g., a touch, a tap, a gesture, typing, etc.), one or more voice commands (e.g., "verify lane shift," "flag construction zone," etc.), or a combination thereof.

When the user selects the "More Details" button 613, the user interface 601 shows a live traffic image 617 and an alert 619: "Estimated Delay: 15 minutes." The system 100 can prompt the user to confirm the road geometry change and/or the road incident determined by the system 100 for training the machine learning model as discussed. This is particularly true in the case of a user that is a passenger in an autonomous vehicle. It is contemplated that the system 100 can determine or detect one or more actions by a user (e.g., an eye gaze) and automatically confirm the road geometry change and/or the road incident accordingly.

FIG. 6B is a diagram of an example user interface for navigating around a road incident, according to example embodiment(s), such as after the user selects the "Reroute" button 615. In this example, a user interface (UI) 621 is generated for the UE 111 that includes a map 623, an input 625 of "Start Navigation" between an origin 627 and a destination 629. Since the system 100 detects the road geometry change and/or the road incident 607 on the route 609 of the user, and shows an alternative route 631 and an alert 633: "Estimated Time of Arrival 6:30 pm." In addition, the UI 621 shows an input 635 of "Show POI," for the user to select and see points of interest on the alternative route 631.

In one embodiment, the machine learning system 125 can select respective factors such as transport modes, traffic patterns, road topology, driving behaviors, location sensor errors, etc., to determine optimal travelled link options for different scenarios in different regions (e.g., towns, city, suburbs, mountains, countries, etc.). In one embodiment, machine learning system 125 can train a machine learning model to select or assign respective weights, correlations, relationships, etc. among the factors, to determine optimal travelled link options for different scenarios. In one instance, machine learning system 125 can continuously provide and/or update the machine learning model (e.g., a support vector machine (SVM), neural network, decision tree, etc.) during training using, for instance, supervised deep convolution networks or equivalents. In other words, machine learning system 125 can train the machine learning model using the respective weights of the factors to most efficiently select optimal travelled link options for different scenarios in different regions.

In another embodiment, the machine learning system 125 of the mapping platform 107 includes a neural network or other machine learning system to compare (e.g., iteratively) vehicle paths features and/or enhanced vehicle path features (e.g., using distance/heading/speed thresholds, offsets, etc.) to detect road incidents (e.g., a construction zone) on road links. In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 109 to the probe data layer 121 and/or the geographic database 123 that can each store probe data, labeled or marked features, etc.

In one embodiment, machine learning system 125 can improve the route-building and/or road incident detecting process using feedback loops based on, for example, user behavior and/or feedback data (e.g., from road incident specialists). In one embodiment, machine learning system 125 can improve the machine learning model for the route-building and/or road incident detecting process using user behavior and/or feedback data as training data. For example, machine learning system 125 can analyze correctly identified taken route data and/or road incident data, missed taken route data and/or road incident data, etc. to determine the performance of the machine learning model.

The above-discussed embodiments can be apply to road links including motorways, walkways, bicycle paths, train tracks, airplane runways, etc. to detect road geometry change and/or the road incident (e.g., a construction zone) thereon real-time or substantially real time, and update map data accordingly thereby provide real-time location based services such as mapping services, navigation services, road incident services, travel planning services, notification services, etc.

Returning to FIG. 1, in one embodiment, the mapping platform 107 performs the process for aggregating an incident route based on high-resolution sampling as discussed with respect to the various embodiments described herein. For example, the mapping platform 107 can generate vehicle path related features (e.g., road geometry change(s), road incident(s), etc.) for map data validation and/or updates.

In one embodiment, the mapping platform 107 has connectivity over the communications network 109 to the services platform 115 (e.g., an OEM platform) that provides the services 117*a*-117*n* (also collectively referred to herein as services 117) (e.g., probe and/or sensor data collection services). By way of example, the services 117 may also be other third-party services and include mapping services, navigation services, road incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road link is closed or not) of the mapping platform 107 to provide services such as navigation, mapping, other location-based services, etc.

In one embodiment, the mapping platform 107 may be a platform with multiple interconnected components. The mapping platform 107 may include multiple servers, intelligent networking devices, computing devices, components, and corresponding software for providing parametric representations of lane lines. In addition, it is noted that the mapping platform 107 may be a separate entity of the system 100, a part of the services platform 115, a part of the one or more services 117, or included within a vehicle 103 (e.g., an embedded navigation system).

In one embodiment, content providers 119*a*-*m* may provide content or data (e.g., including road closure reports, probe data, expected vehicle volume data, etc.) to the mapping platform 107, the UEs 111, the applications 113, the services platform 115, the services 117, the probe data layer 121, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the mapping platform 107, the services platform 115, the services 117, the probe data layer 121, the geographic database 123, and/or the vehicles 103. In another embodiment, the content providers 119 may manage access to a central repository of data, and offer a consistent, standard interface to data, such as a repository of the probe data layer 121 and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the mapping platform 107 to aggregate an incident route based on high-resolution sampling.

In one embodiment, as mentioned above, the vehicles 103, for instance, are part of a probe-based system for collecting probe data for detecting actual and expected vehicle volumes on a road network and/or measuring traffic conditions in a road network (e.g., free flow traffic versus a road closure). In one embodiment, each vehicle 103 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probe points can be reported from the vehicles 103 in real-time, in batches, continuously, or at any other frequency requested by the system 100 over, for instance, the communication network 109 for processing by the mapping platform 107. The probe points also can be map matched to specific road links stored in the geographic database 123. In one embodiment, the system 100 (e.g., via the mapping platform 107) generates vehicle paths or trajectories from the observed and expected frequency of probe points for an individual probe as discussed with respect to the various embodiments described herein so that the probe traces represent a travel trajectory or vehicle path of the probe through the road network.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the probe data layer 121) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travels through road links of a road network.

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position, and location of a vehicle 103 travelling along a link or road link. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting the probe data collected by the vehicles 103 and/or UEs 111. In one embodiment, each vehicle 103 and/or UE 111 is configured to report probe data as probe points, which are individual data records collected at a point in time that records telemetry data.

In one embodiment, the mapping platform 107 retrieves aggregated probe points gathered and/or generated by the vehicle sensors 105 and/or the UEs 111 resulting from the travel of the UEs 111 and/or vehicles 103 on a road link of a road network. In one instance, the probe data layer 121 stores a plurality of probe points and/or trajectories generated by different vehicle sensors 105, UEs 111, applications 113, vehicles 103, etc. over a period while traveling in a large, monitored area (e.g., a stretch of roadway where a closure incident is reported). A time sequence of probe points specifies a trajectory—i.e., a path traversed by a UE 111, application 113, vehicle 103, etc. over the period. In one instance, as the time between data points increases, so does the distance and the possible routes/paths between those two points.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, mapping platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
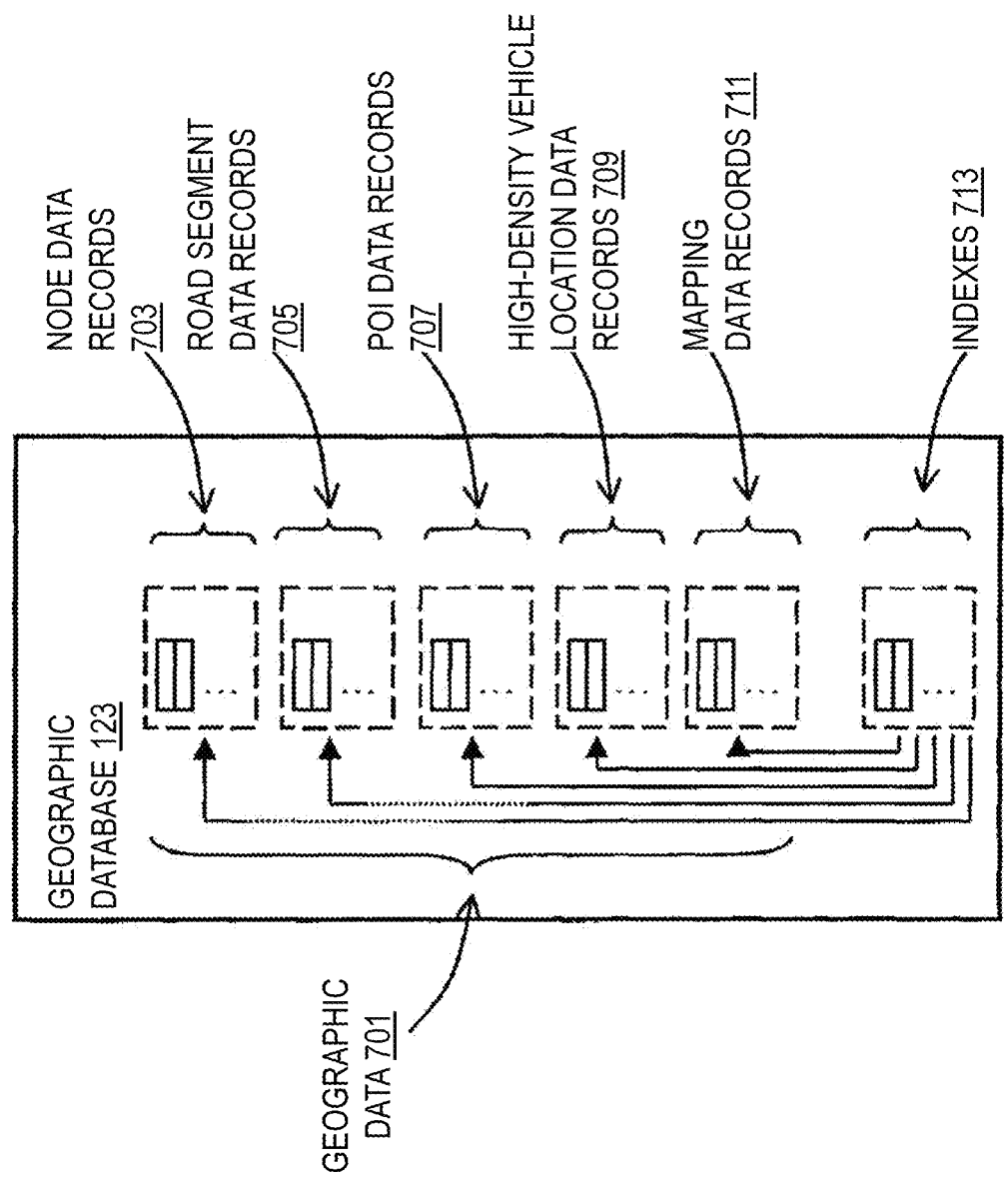
FIG. 7 is a diagram of a geographic database, according to example embodiment(s)

FIG. 7 is a diagram of a geographic database (such as the database 123), according to example embodiment(s). In one embodiment, the geographic database 111 includes geographic data 701 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 711) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"— A point that terminates a link.

"Line segment"— A straight line connecting two points.

"Link" (or "edge")— A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road link or link data records 705, POI data records 707, high-density vehicle location data records 709, mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 123. In one embodiment, the indexes 713 may be used to quickly locate data without having to search every row in the geographic database 123 every time it is accessed. For example, in one embodiment, the indexes 713 can be a spatial index of the polygon points associated with stored feature polygons.

In exemplary embodiments, the road link data records 705 are links or segments representing roads, streets, or paths, as can be used in the calculated route or recorded route information for determination of one or more personalized routes. The node data records 703 are end points (such as intersections) corresponding to the respective links or segments of the road link data records 705. The road link data records 705 and the node data records 703 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. The geographic database 123 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city). In one embodiment, certain attributes, such as lane marking data records, mapping data records and/or other attributes can be features or layers associated with the link-node structure of the database.

In one embodiment, the geographic database 123 can also include the high-density vehicle location data records 709 for storing high-density vehicle location data records, traveled link option data, probable matching road link, link set data, road geometry data, road incident data, reliability index data, training data, prediction models, annotated observations, computed featured distributions, sampling probabilities, and/or any other data generated or used by the system 100 according to the various embodiments described herein. By way of example, the high-density vehicle location data records 709 can be associated with one or more of the node records 703, road link records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the mapping data records 711 model road surfaces and other map features to centimeter-level or better accuracy. The mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 711 are divided into spatial partitions of varying sizes to provide mapping data to vehicles 103 and other end user devices with near real-time speed without overloading the available resources of the vehicles 103 and/or devices (e.g., computational, memory, bandwidth, etc. resources).

In one embodiment, the mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 711.

In one embodiment, the mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 115 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or UEs 111) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for aggregating an incident route based on high-resolution sampling may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
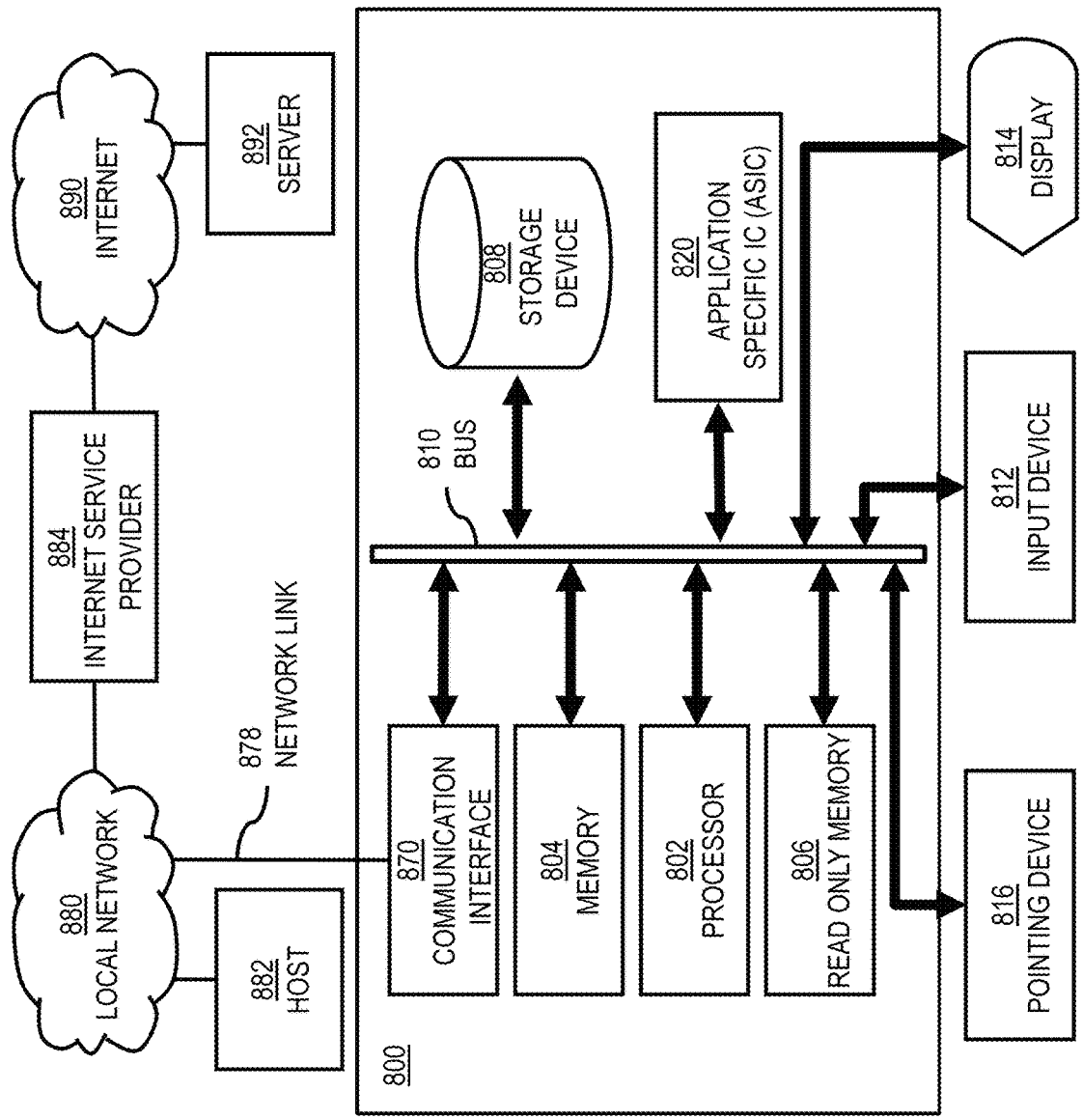
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to aggregate an incident route based on high-resolution sampling as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to aggregating an incident route based on high-resolution sampling. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for aggregating an incident route based on high-resolution sampling. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for aggregating an incident route based on high-resolution sampling, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 109 for aggregating an incident route based on high-resolution sampling.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to aggregate an incident route based on high-resolution sampling as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to aggregate an incident route based on high-resolution sampling. The memory 905 also stores the data associated with or generated by the execution of the inventive steps.

Figure 10:
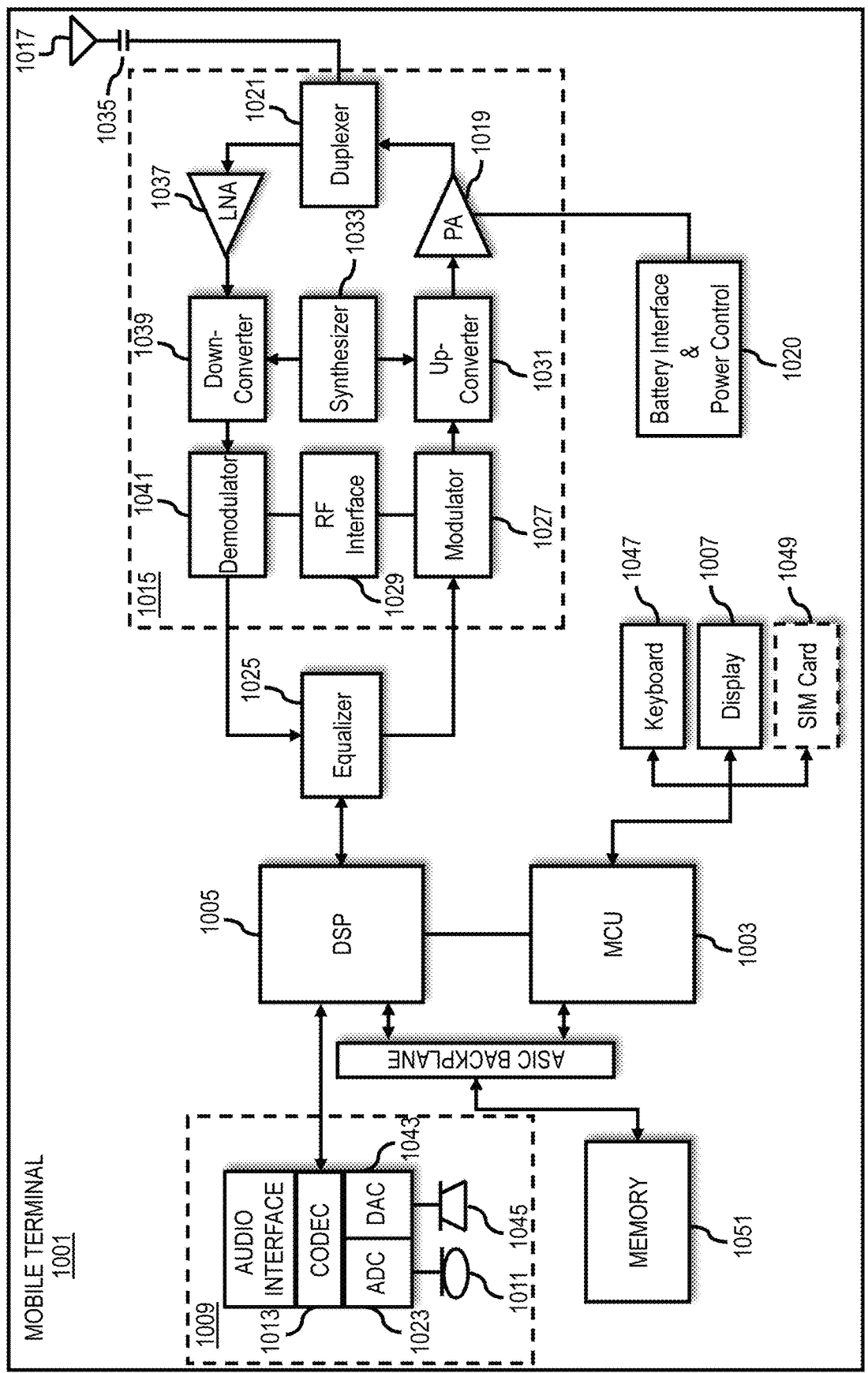
FIG. 10 is a diagram of a mobile terminal (e.g., handset or vehicle or part thereof) that can be used to implement an embodiment.

FIG. 10 is a diagram of exemplary components of a mobile terminal 1001 (e.g., handset or vehicle or part thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/ modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to aggregate an incident route based on high-resolution sampling. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

receiving, at one or more processors, a sequence of location data points representing a path traveled in a geographic area, wherein the sequence of location data is acquired via one or more sensors;

generating, by the one or more processors, an initial link set comprising a first predetermined number of a plurality of traveled link options based on an initial location data point of the sequence, wherein each of the plurality of traveled link options respectively comprises one or more road links of a geographic database to which the initial location data point is matched;

determining, by the one or more processors, a second predetermined number of a plurality of probable matching road links of the geographic database for a next location data point of the sequence;

computing, by the one or more processors, a plurality of respective probabilities for a plurality of respective pairs of (i) the plurality of traveled link options and (ii) the plurality of probable matching road links, wherein each probability, from among the plurality of respective probabilities, respectively indicates a likelihood that one or more road links comprised within a traveled link option and a probable matching road link of the respective pair are connected;

aggregating, by the one or more processors, the plurality of respective pairs to reduce a number of the plurality of respective pairs into the first predetermined number or another predetermined number of traveled link options of a new link set based on the plurality of respective probabilities;

processing, by the one or more processors, the sequence of location data points, one or more characteristics of the sequence location data points, other sensor data associated with the sequence of location data points to determine one or more indications of a road incident;

flagging, by the one or more processors, the one or more road links of the initial link set, the new link set, or a combination thereof associated with the one or more indications of the road incident as low-reliability map data; and initiating, by the one or more processors, a map update, a validation, or a combination thereof the geographic database based on the flagging.

2. The method of claim 1, further comprising:

iterating, by the one or more processors, the determining of the second predetermined number of the plurality of probable matching road links, the computing of the plurality respective probabilities, the aggregating of the plurality of respective pairs, or a combination thereof for one or more subsequent location data points of the sequence until a stopping criterion is met.

3. The method of claim 2, wherein the stopping criterion includes determining that the plurality of respective probabilities for the plurality of probable matching road links for the one or more subsequent location data points is below a threshold probability.

4. The method of claim 1, wherein the sequence of location data points is sampled from a larger set of location data points based on an offset threshold from one or more start nodes, one or more end nodes, or a combination thereof of road link data stored in the geographic database.

5. The method of claim 1, wherein the plurality of traveled link options of the new link set is generated by adding the one or more road links of the traveled link option and the probable matching road link in each of the plurality of respective pairs in the new link set.

6. The method of claim 1, wherein the aggregating of the plurality of respective pairs comprises extracting one of the plurality of traveled link options of the new link set respectively for each of the plurality of probable matching road links for the next location data point in the sequence.

7. The method of claim 1, further comprising:

generating, by the one or more processors, one or more instructions for operating an autonomous vehicle based on the map update, the validation, or a combination thereof on the user interface, wherein user interface depicts a map representation, one or more navigation instructions, a navigation route, the road incident, or a combination thereof; and at least one of: causing, by the one or more processors, a presentation of the user interface, or causing, by the one or more processors, the autonomous vehicle to execute the one or more instructions.

8. The method of claim 1, wherein the plurality of respective probabilities is computed based on an existence of a connection between the one or more road links of the traveled link option and the probable matching road link in each of the plurality of respective pairs, one or more map attributes of the one or more road links of the traveled link option and the probable matching road link in each of the plurality of respective pairs, or a combination thereof.

9. The method of claim 1, wherein the plurality of probable matching road links is determined using a point-based map matcher.

10. An apparatus comprising:

at least one processor; and at least one memory including computer program code for one or more programs, the at least one memory and the computer program code configured to, with the at least one processor, cause the apparatus to:

receive a sequence of location data points representing a path traveled in a geographic area, wherein the sequence of location data is acquired via one or more sensors;

generate an initial link set comprising a first predetermined number of a plurality of traveled link options based on an initial location data point of the sequence, wherein each of the plurality of traveled link options respectively comprises one or more road links of a geographic database to which the initial location data point is matched;

determine a second predetermined number of a plurality of probable matching road links of the geographic database for a next location data point of the sequence;

compute a plurality of respective probabilities for a plurality of respective pairs of (i) the plurality of traveled link options and (ii) the plurality of probable matching road links, wherein each probability, from among the plurality of respective probabilities, respectively indicates a likelihood that one or more road links comprised within a traveled link option and a probable matching road link of the respective pair are connected;

aggregate the plurality of respective pairs to reduce a number of the plurality of respective pairs into the first predetermined number or another predetermined number of traveled link options of a new link set based on the plurality of respective probabilities;

process the sequence of location data points, one or more characteristics of the sequence location data points, other sensor data associated with the sequence of location data points to determine one or more indications of a road incident;

flag the one or more road links of the initial link set, the new link set, or a combination thereof associated with the one or more indications of the road incident as low-reliability map data; and initiate a map update, a validation, or a combination thereof the geographic database based on the flagging.

11. The apparatus of claim 10, wherein the apparatus is further caused to:

iterate the determining of the second predetermined number of the plurality of probable matching road links, the computing of the plurality respective probabilities, the aggregating of the plurality of respective pairs, or a combination thereof for one or more subsequent location data points of the sequence until a stopping criterion is met.

12. The apparatus of claim 11, wherein the stopping criterion includes determining that the plurality of respective probabilities for the plurality of probable matching road links for the one or more subsequent location data points is below a threshold probability.

13. The apparatus of claim 10, wherein the sequence of location data points is sampled from a larger set of location data points based on an offset threshold from one or more start nodes, one or more end nodes, or a combination thereof of road link data stored in the geographic database.

14. A non-transitory computer-readable storage medium carrying one or more sequences of one or more instructions which, when executed by one or more processors, cause an apparatus to:

receive a sequence of location data points representing a path traveled in a geographic area, wherein the sequence of location data is acquired via one or more sensors;

generate an initial link set comprising a first predetermined number of a plurality of traveled link options based on an initial location data point of the sequence, wherein each of the plurality of traveled link options respectively comprises one or more road links of a geographic database to which the initial location data point is matched;

determine a second predetermined number of a plurality of probable matching road links of the geographic database for a next location data point of the sequence;

compute a plurality of respective probabilities for a plurality of respective pairs of (i) the plurality of traveled link options and (ii) the plurality of probable matching road links, wherein each probability, from among the plurality of respective probabilities, respectively indicates a likelihood that one or more road links comprised within a traveled link option and a probable matching road link of the respective pair are connected; and aggregate the plurality of respective pairs to reduce a number of the plurality of respective pairs into the first predetermined number or another predetermined number of traveled link options of a new link set based on the plurality of respective probabilities;

process the sequence of location data points, one or more characteristics of the sequence location data points, other sensor data associated with the sequence of location data points to determine one or more indications of a road incident;

flag the one or more road links of the initial link set, the new link set, or a combination thereof associated with the one or more indications of the road incident as low-reliability map data; and initiate a map update, a validation, or a combination thereof the geographic database based on the flagging.

15. The non-transitory computer-readable storage medium of claim 14, wherein the apparatus is caused to:

iterate the determining of the second predetermined number of the plurality of probable matching road links, the computing of the plurality respective probabilities, the aggregating of the plurality of respective pairs, or a combination thereof for one or more subsequent location data points of the sequence until a stopping criterion is met.

* * * * *